United States Patent [19]

Matai

[11] Patent Number: 5,525,974

[45] Date of Patent: Jun. 11, 1996

[54] RADIO SELECTIVE CALLING RECEIVER FOR RECEIVING A CALL SIGNAL INTERMITTENTLY UNDER AN ASYNCHRONOUS SYSTEM

[75] Inventor: Masahiro Matai, Tokyo, Japan

[73] Assignee: NEC Corporation, Tokyo, Japan

[21] Appl. No.: 360,070

[22] Filed: Dec. 20, 1994

[30] Foreign Application Priority Data

Dec. 20, 1993 [JP] Japan .................................. 5-320462

[51] Int. Cl.$^6$ ........................................... H04Q 7/14
[52] U.S. Cl. ........................ 340/825.440; 340/825.470; 340/825.210
[58] Field of Search ................ 340/825.440, 825.470, 340/825.210, 825.200; 455/38.2, 38.3, 343; 379/56, 57

[56] References Cited

U.S. PATENT DOCUMENTS

| | | | |
|---|---|---|---|
| 4,663,623 | 5/1987 | Lax et al. | 340/825.440 |
| 4,803,703 | 2/1989 | DeLuca et al. | |
| 4,839,639 | 6/1989 | Sato et al. | 340/825.440 |
| 5,227,777 | 7/1993 | Sato et al. | 340/825.44 |

FOREIGN PATENT DOCUMENTS

| | | |
|---|---|---|
| 2103402 | 2/1983 | United Kingdom . |
| 2136178 | 8/1984 | United Kingdom . |
| 2164218 | 3/1986 | United Kingdom . |

*Primary Examiner*—Brian Zimmerman
*Assistant Examiner*—Edwin C. Holloway, III
*Attorney, Agent, or Firm*—Sughrue, Mion, Zinn, Macpeak & Seas

[57] ABSTRACT

In a radio selective calling receiver or so-called a pager having a middle synchronization function, detection of a BCH code is performed after synchronization is established by erroneous detection of synchronization caused by noise. With this operation, setting of the SC search mode after erroneous detection of synchronization caused by noise is prevented, thereby reducing the power consumption of the radio selective calling receiver.

6 Claims, 4 Drawing Sheets

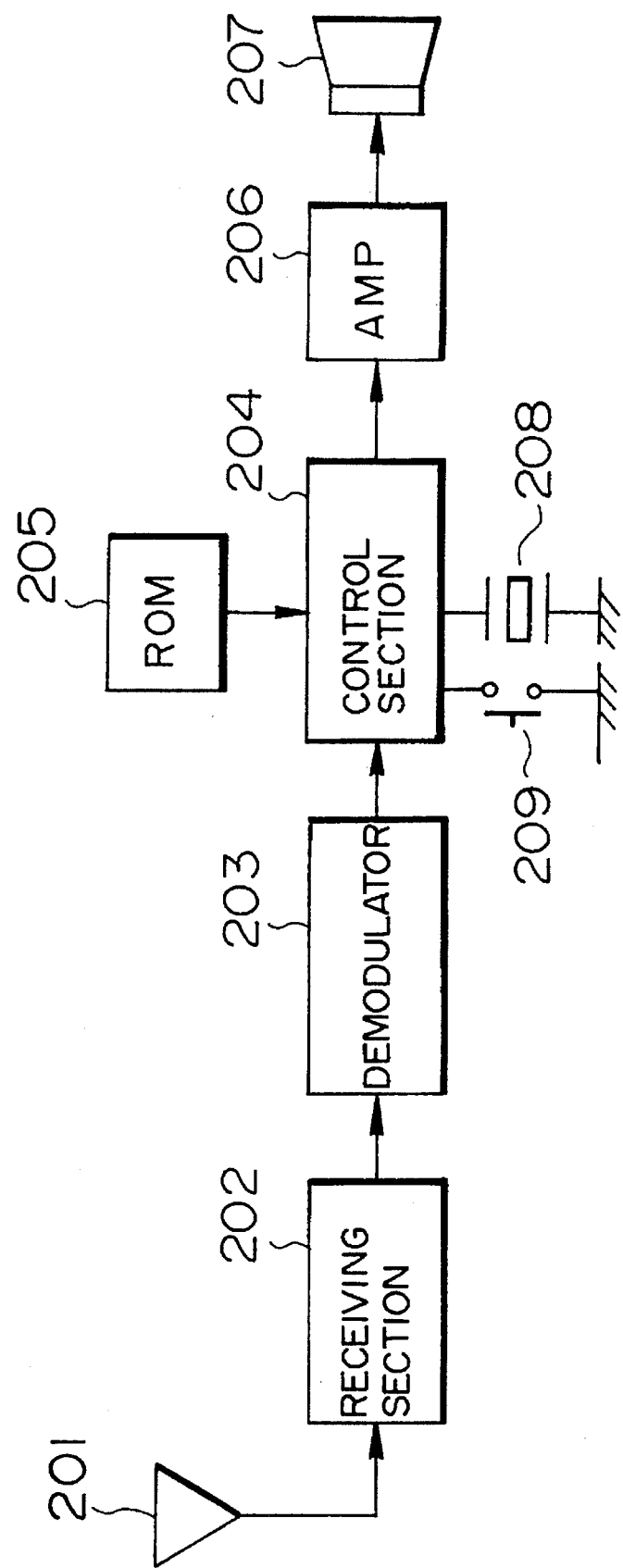

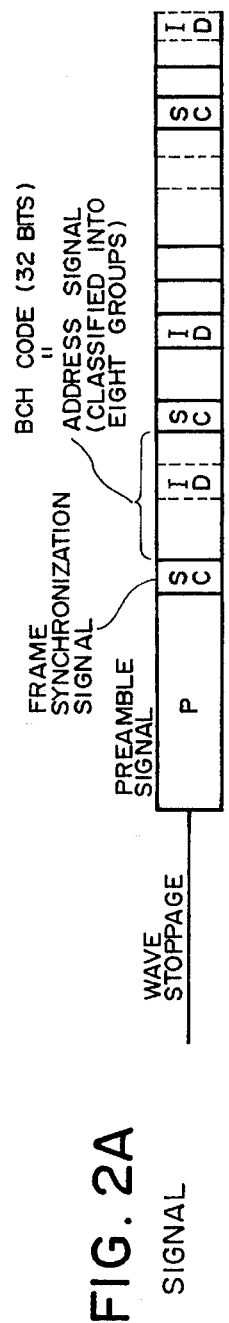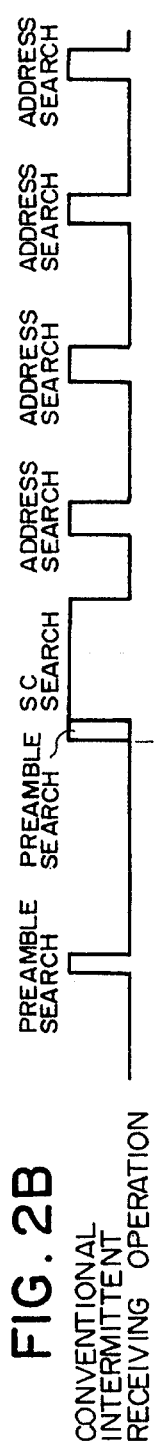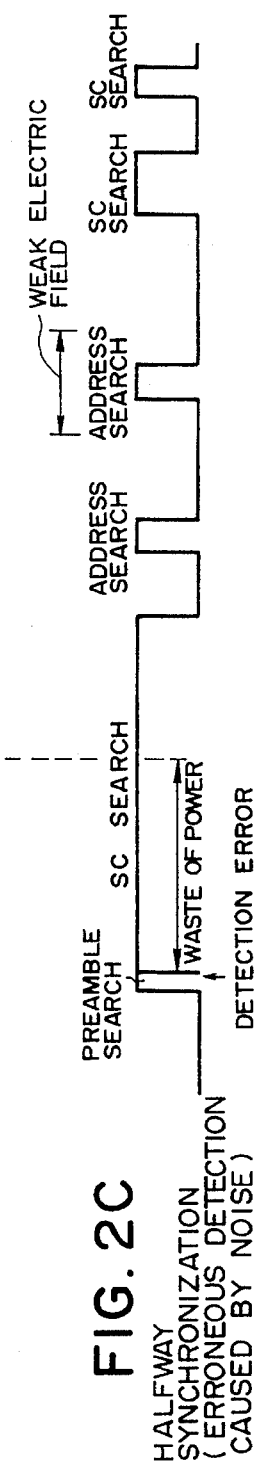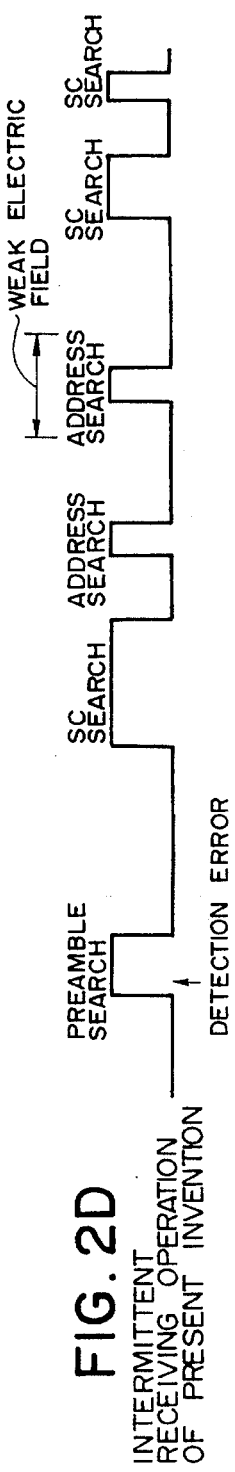
FIG. 2A  SIGNAL
FIG. 2B  CONVENTIONAL INTERMITTENT RECEIVING OPERATION
FIG. 2C  HALFWAY SYNCHRONIZATION (ERRONEOUS DETECTION CAUSED BY NOISE)
FIG. 2D  INTERMITTENT RECEIVING OPERATION OF PRESENT INVENTION

FIG. 3
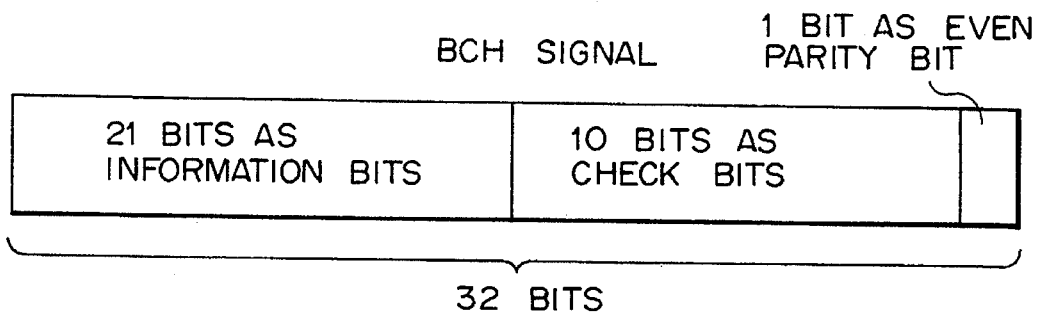
FIG. 4A
RECEPTION SIGNAL
FIG. 4B
BIT SYNCHRONIZATION SIGNAL
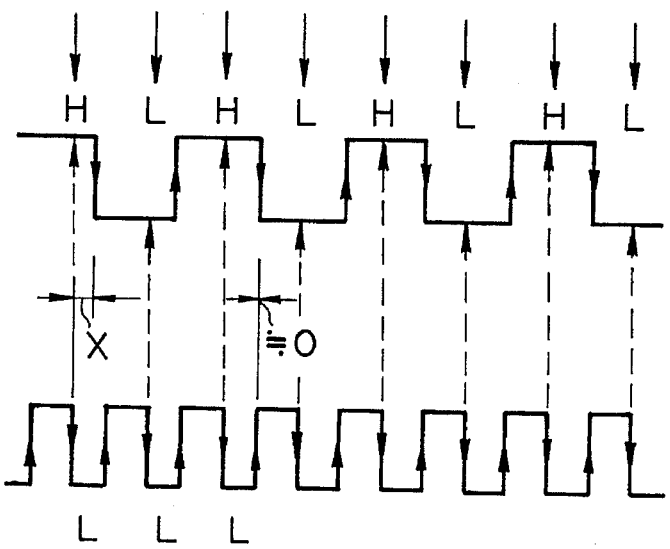
FIG. 4C
MIDDLE SYNCHRONIZATION WINDOW
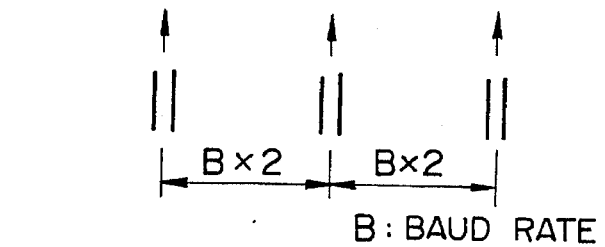
B: BAUD RATE

RADIO SELECTIVE CALLING RECEIVER FOR RECEIVING A CALL SIGNAL INTERMITTENTLY UNDER AN ASYNCHRONOUS SYSTEM

BACKGROUND OF THE INVENTION

1. Field of the Invention

The present invention relates to a radio selective calling receiver or so called a pager and, more particularly, to a radio selective calling receiver for controlling its intermittent receiving operation to realize a reduction in power consumption.

2. Description of the Prior Art

A conventional radio selective calling receiver (to be referred to as a receiver hereinafter) for receiving a POCSAG code as an asynchronous signal performs an intermittent receiving operation to prolong the service time of a battery. In the intermittent receiving operation, grouping of transmitted signals is performed, and the receiver is operated only when a transmitted signal belongs to a self-group, thereby shortening the operating time of the receiver.

FIG. 1 is a block diagram showing a general receiver. The arrangement of the receiver will be described with reference to FIG. 1.

A radio wave received via an antenna 201 is amplified by a receiving section 202 and converted into a digital signal by a demodulator 203. A control section 204 performs signal synchronization for this digital signal, reads out a self-ID from a ROM 205 in which the self-ID is stored in advance, and compares the digital signal with the self-ID.

If a self-ID is detected in the digital signal, the control section 204 sends the signal to an amplifier 206 and drives a speaker 207, thereby informing the user of the reception of the signal. A clock 208 is a reference clock used to operate the control section 204 and is also used as a sync clock. A switch 209 is used, for example, to stop an informing operation.

FIGS. 2A to 2D show the operation timings of the receiver.

FIG. 2A shows a signal to be transmitted. A preamble signal (P) used for bit synchronization is transmitted first after a state wherein no signal is transmitted (wave stoppage). A frame sync signal (SC) indicating the position of the signal is then transmitted. Subsequently, address signals classified into several groups (eight groups according to POCSAG) are transmitted. If a large number of IDs are to be transmitted, an SC signal and address signals are repeatedly transmitted.

FIG. 2B shows the timings of the intermittent receiving operation of the receiver.

In a state of wave stoppage, the receiver is operated for a short period of time to detect a preamble signal so as to detect whether a radio wave is transmitted (preamble search mode). When the receiver is activated in the presence of a preamble signal (signal repeating "1" and "0"), bit synchronization is established by this preamble signal to allow the receiver to recognize the preamble signal. The receiver is then shifted to a detection mode (SC search mode) of detecting an SC signal following the preamble signal. Upon detection of the SC signal, the position of the signal is determined. Therefore, the receiver is operated only with a self-group in which a self-ID can be set (address search mode).

A transmitted signal set in each group is subjected to error correction, and a BCH code is used to improve the reliability of the signal.

FIG. 3 shows the format of the BCH code. The BCH code is constituted by 32 bits, i.e., 21 bits as information bits, 10 bits as check bits, and one bit as an even parity bit. This signal has an inter-code distance with respect to another BHC code signal and hence can be reproduced even if an error occurs in the signal.

An address code is a BCH code. For this reason, if transmission is stopped during the address search mode, the BCH code cannot be recognized because a noise signal is received. As a result, the receiver is shifted to the preamble search mode as a mode for a state of wave stoppage.

A radio wave condition for the receiver, however, is not stable because of the influences of waves reflected by buildings and the like. For this reason, in spite of the fact that a signal is actually transmitted, a BCH code may not be recognized because of a weak electric field, and the receiver may be shifted to the preamble search mode. In this case, in spite of the fact that the address follows the SC signal, the receiver can hardly search for a preamble signal. Consequently, the receiver cannot detect the preamble signal, and hence cannot detect the signal belongs to the self-group. Even if, therefore, a self-ID is set in the self-group in this state, the receiver cannot receive the signal. For this reason, a middle synchronizing function is provided for the receiver to quickly restore to the address search mode.

FIGS. 4A to 4C show a synchronization method. Bit synchronization and middle synchronization will be described below with reference to FIGS. 4A to 4C.

FIG. 4A shows a received signal. As this received signal, a preamble signal (signal repeating "1" and "0"). FIG. 4B shows a clock for bit synchronization performed by the control section 204. FIG. 4C shows window frames arranged in the control section 204 to establish middle synchronization.

Bit synchronization will be described first. Consider the received signal shown in FIG. 4A and the bit synchronization clock (twice as fast as the received signal). The logic of the bit synchronization clock at the time when the logic of the received signal changes is determined. The bit synchronization clock is controlled as follows. If the bit synchronization clock is at "L" at this time, the duration of the clock is reduced by a predetermined time. If the bit synchronization clock is at "H", the clock is advanced by a predetermined time. In this case, since the bit synchronization clock is kept at "L"(until X≈0), a value X is gradually reduced. Bit synchronization is established at a time point at which the value X approaches "0" (falls within a certain range).

Note that the received signal is determined at the trailing edge of the bit synchronization clock. That is, when bit synchronization is established, the leading edge of the received signal coincides with that of the bit synchronization clock. Therefore, the trailing edge of the bit synchronization clock coincides with a middle point of the received signal, allowing accurate reading of reception data.

Middle synchronization will be described next. Window frames, each having a predetermined width equivalent to ½ the baud rate of the receiver, are prepared in the receiver. The first window frame is arranged at the leading edge of the received signal. It is then checked how many leading edges of the received signal appear in the subsequent window frames. When a predetermined number of leading edges is checked, middle synchronization is established, and the SC search mode is set (if the received signal is a signal of the baud rate of the receiver, all the leading edges appear in the window frames). That is, middle synchronization can be established during reception of an address signal or the like.

As described above, if only the conventional middle synchronization method is used, a change point of noise may appear in a window frame, resulting in erroneous middle synchronization. In this case, since a battery saving operation as shown in FIG. 2C is performed, the SC search mode time is prolonged. That is, the power consumption increases, thus posing a serious problem.

SUMMARY OF THE INVENTION

It is an object of the present invention to reduce the power consumption by controlling the operating time of a receiver when middle synchronization is erroneously detected because of noise.

The present invention comprises bit synchronization establishing means, means for detecting a preamble signal, means for extracting a predetermined number of bits from a received signal, means for determining whether the predetermined number of bits constitute a BCH code, and means for determining whether the predetermined number of bits constitute an SC code.

BRIEF DESCRIPTION OF THE DRAWINGS

FIG. 1 is a block diagram showing a radio selective calling receiver to which the present invention is applied;

FIG. 2A is a timing chart showing the format of a received signal for the radio selective calling receiver;

FIG. 2B is a timing chart showing the conventional intermittent receiving operation of the radio selective calling receiver;

FIG. 2C is a timing chart showing the conventional intermittent receiving operation of the radio selective calling receiver in performing middle synchronization;

FIG. 2D is a timing chart showing the intermittent receiving operation of the radio selective calling receiver according to the present invention;

FIG. 3 is a chart showing the format of a BCH code;

FIG. 4A is a timing chart showing a preamble signal for the radio selective calling receiver;

FIG. 4B is a timing chart showing a bit sync signal for the radio selective calling receiver;

FIG. 4C is a timing chart showing middle synchronization window frames for the radio selective calling receiver.

DETAILED DESCRIPTION OF THE PREFERRED EMBODIMENT

Figure 5:
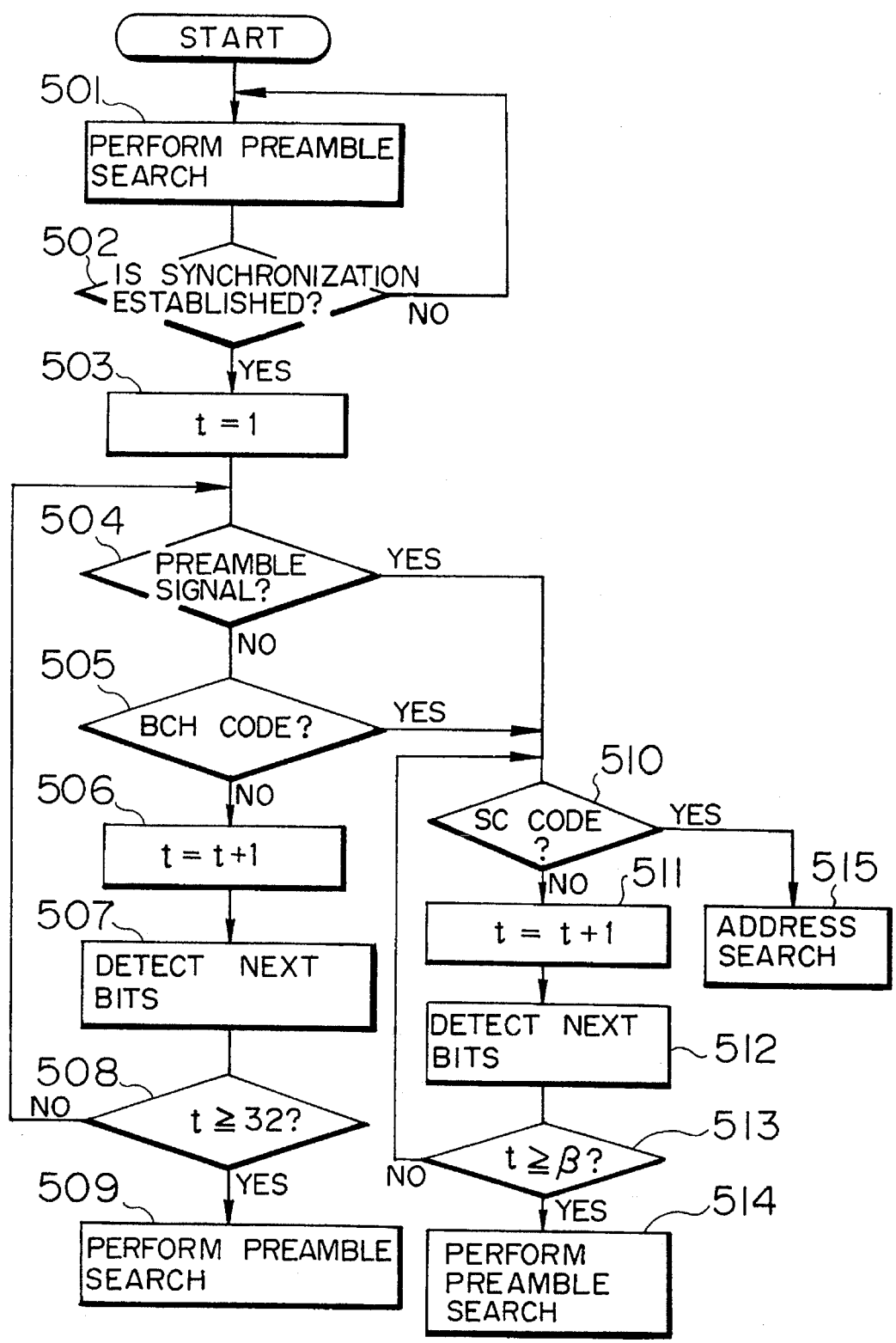
FIG. 5 is a flow chart showing the intermittent receiving operation of the radio selective calling receiver according to the present invention.

The present invention will now be described below.

FIG. 2D shows an intermittent receiving operation according to the present invention.

When middle synchronization is erroneously established owing to noise in the preamble search mode in a state of wave stoppage, the received signal is extracted 32 bits at a time while the signal is shifted bit by bit, and it is checked whether each 32-bit signal is a BCH code.

Since a BCH code is inserted, as an address signal, in a self-baud rate signal for every 32 bits, a BCH code can be recognized until the signal is shifted by at least 32 bits.

In the embodiment of the present invention, if a BCH code cannot be recognized because of noise, it is determined that middle synchronization is erroneously established, and the operation of the receiver is stopped. In contrast to this, if the received signal is a self-signal, the same operation as that of the conventional receiver can be performed.

The above operation will be described in detail with reference to the flow chart shown in FIG. 5.

In step 501, the receiver is set in the preamble search mode. If it is determined in step 502 that bit synchronization and middle synchronization are not established, it is determined that the received signal is not a self-signal, and the preamble search is continued.

If synchronization is established, a register (t) of a control section 204 is set to "1" (step 503), and 32 bits, of the received signal are extracted to check whether the extracted 32-bit signal is a preamble signal (step 504). If the extracted signal is not a preamble signal, it is checked whether the signal is a BCH code (step 505). If the signal is not a BCH code, the contents of the register (t) are shifted forward (step 506), and 32 bits are extracted from the received signal which is shifted by one bit (step 507). The flow then returns to step 504 to check whether the extracted 32-bit signal is a preamble signal or a BCH code.

If the register (t) exceeds 32 (step 508), it can be determined that no address signal is present. Therefore, the flow advances to the preamble search mode (step 509).

If it is determined in step 504 or 505 that the signal is a preamble signal or a BCH code, the receiver is set in the SC search mode, and the same operation as that of the conventional receiver is performed.

If it is determined in step 510 that the signal is a frame sync signal SC, the receiver is set in the address search mode (step 515), in which the receiver is operated only when the received signal belongs to the self-group, because the position of the self-signal is specified in advance. However, if no frame sync signal SC is detected, the contents of the register (t) are shifted forward (step 511), and the next extracted signal is detected (step 512). It is checked whether an SC code appears until the register is shifted by a predetermined number (β) of bits (step 513) (since an SC code appears at a predetermined period based on the system, the value of β is set to allow such determination of an SC code). If no SC code is present, the receiver is set in the preamble search mode (step 514) (note that, in practice, since determination of a BCH code is performed in step 505, the flow advances to step 510 only when the received signal is a self-signal, so that the flow advances to the address search mode in step 515 without fail.

As has been described above, according to the present invention, since a BCH code is detected after synchronization is established, no determination error is caused by noise. Therefore, the SC search mode is not set by a determination error caused by noise, and an increase in the operating time of the receiver can be prevented. That is, a receiver with low power consumption can be realized.

What is claimed is:

1. A radio selective calling receiver adapted to receive a call signal intermittently under an asynchronous system comprising:

first detection means for detecting a sync signal based on a received call signal and for providing an output if the sync signal has been established;

second detection means, operable when the output of the first detection means indicates that the sync signal has been detected, for detecting a first formatted signal and for detecting a second formatted signal, each of said first and second formatted signals including a plurality of bits from the received call signal, the first formatted signal being a preamble portion of the received call signal, the second formatted signal including an address portion but not including a reference position of the received call signal, the first and second formatted signals having a format determined by the asynchronous system; and third detection means, operable if said second detection means detects at least one of the first and second formatted signals, for detecting a third formatted signal including a plurality of bits from the received call signal, the third formatted signal indicating the reference position of the call signal;

wherein operation of the receiver is temporarily stopped upon said second detection means indicating that the first and second formatted signals have not been detected.

2. The receiver according to claim 1, wherein the sync signal is a signal having a plurality of level change points, the second formatted signal is a BCH code, and the third formatted signal is a frame sync signal.

3. The receiver according to claim 1, wherein operation of the receiver is also temporarily stopped upon said third detection means indicating that the third formatted signal has not been detected.

4. A method of operating a receiver for receiving a call signal intermittently under an asynchronous system comprising the steps of:

a.) detecting a sync signal based on a received call;

b.) detecting a first formatted signal and a second formatted signal when said sync signal has been detected, the first formatted signal being a preamble portion of the received call signal, the second formatted signal including an address portion but not including a reference position of the received call signal, the first and second formatted signals each including a plurality of bits from the received call signal and each having a format determined by the asynchronous system;

c.) detecting a third formatted signal including a plurality of bits from the received call signal when at least one of the first and second formatted signals have been detected, the third formatted signal indicating a reference position of the call signal; and d.) temporarily halting the operation of the receiver upon said first and second formatted signals not being detected.

5. The method according to claim 4, wherein the sync signal is a signal having a plurality of level change points, the second formatted signal is a BCH code, and the third formatted signal is a frame sync signal.

6. The method according to claim 4, further comprising the step of temporarily halting the operation of the receiver upon a third formatted signal not being detected.

* * * * *